(12) United States Patent
Brown

(10) Patent No.: US 6,240,393 B1
(45) Date of Patent: May 29, 2001

(54) AGGREGATING AND POOLING WEIGHT LOSS INFORMATION IN A COMMUNICATION SYSTEM WITH FEEDBACK

(75) Inventor: Stephen J. Brown, Woodside, CA (US)

(73) Assignee: Health Pro Network, Inc., Mountain View, CA (US)

( * ) Notice: Subject to any disclaimer, the term of this patent is extended or adjusted under 35 U.S.C. 154(b) by 0 days.

(21) Appl. No.: 09/160,970

(22) Filed: Sep. 25, 1998

Related U.S. Application Data

(63) Continuation-in-part of application No. 09/092,604, filed on Jun. 5, 1998, now Pat. No. 6,023,686.

(51) Int. Cl.[7] .................................................... G06F 17/60
(52) U.S. Cl. .................................. 705/1; 705/10; 705/12
(58) Field of Search ............................... 705/1, 7, 10, 12, 705/26, 41; 395/200.3, 200.31, 200.33, 200.53, 200.54; 379/92.01, 92.02, 92.03, 92.04; 463/1, 30, 40, 36; 273/26, 371, 408, 409

(56) References Cited

U.S. PATENT DOCUMENTS

| | | | |
|---|---|---|---|
| 5,593,349 | * | 1/1997 | Miguel et al. ........................ 463/30 |
| 5,675,635 | * | 10/1997 | Vos et al. ............................. 379/113 |
| 5,796,393 | * | 8/1998 | MacNaughton et al. ............ 345/329 |
| 5,835,896 | * | 11/1998 | Fisher et al. ............................ 705/37 |
| 5,875,432 | * | 2/1999 | Sehr ....................................... 705/12 |

* cited by examiner

Primary Examiner—Emanuel Todd Voeltz
Assistant Examiner—George D. Morgan
(74) Attorney, Agent, or Firm—Black Lowe & Graham PLLC

(57) ABSTRACT

The invention provides a method and system for aggregating and pooling information with feedback in a computer communication system. A communication system includes a server device and a set of client devices. Each client device collects information from an associated individual (whether by asking questions of those individuals, or accepting data input from peripheral devices), and transmits that data to a server device. The server device, or some other device at its behest, determines statistical information with regard to that data (such as aggregate, correlation, dispersion, or other measures), and provides that information to a communication channel for distribution to the individuals. The communication channel can include either (1) a broadcast communication channel that members of an affinity group can display, or (2) redistributing the determined statistical measures to associated individuals using the client devices. The statistical measure (such as an aggregate or sum) can be computed and distributed for the entire population, or can be computed and compared for selected sub-populations as a contest.

19 Claims, 2 Drawing Sheets

AGGREGATING AND POOLING WEIGHT LOSS INFORMATION IN A COMMUNICATION SYSTEM WITH FEEDBACK

This Appln is a con't-in-part of Ser. No. 09/092,604 filed Jun. 5, 1998, U.S. Pat. No. 6,023,686.

BACKGROUND OF THE INVENTION

1. Field of the Invention

This invention relates to aggregating and pooling information.

2. Related Art

In programs that have a number of participants, it sometimes is desirable to aggregate information from those participants, so as to indicate to individuals in a population when the population (or a subset of that population) is achieving a selected goal. For example, in find-raising events for an affinity group, it is often desirable to publicize to the individuals the progress of the fund-raising event toward a selected goal. Similarly, in an affinity group such as a weight-loss club, it would be advantageous to be able to publicize the collective results of the efforts of individuals in the affinity group.

One problem in the known art is that of collecting information from diverse sources, aggregating that information, and presenting that information to the individual members of the population. This problem is particularly exacerbated if the information to be collected is not available in any single location, and is further exacerbated if the individuals to receive the information to be publicized are not available in any single location.

The known art includes methods for aggregating and pooling information for bidding or otherwise conducting auctions using distributed communication systems. Some of these known methods include systems described as known art in the following applications:

U.S. application Ser. No. 09/092,604, now U.S. Pat. No. 6,023,686, "Method for Conducting an On-Line Bidding Session with Bid Pooling," filed Jun. 5, 1998, in the name of the same inventor, and assigned to the same assignee;

U.S. application Ser. No. 08/603,131, filed Feb. 20, 1996, issued on Aug. 11, 1998, as U.S. Pat. No. 5,794,219, in the name of the same inventor, and assigned to the same assignee.

These applications are hereby incorporated by reference as if fully set forth herein, and are collectively referred to herein as the "On-Line Bidding Disclosures." Although these applications describe other known art, no admission is made herein that any part of these applications are themselves known in the art.

In the On-Line Bidding Disclosures, individual users, coupled to a system using a communication network, are able to enter values into their client devices. The individual values are collected at a server device or other data clearinghouse. The individual values are aggregated or pooled. The aggregated or pooled information is used to determine whether the individual users, either individually or in sub-populations, are winners of the on-line auction.

Accordingly, it would also be advantageous to aggregate or pool information (whether medical, financial, or otherwise) so that the collective information could be publicized to participating individuals. This would be particularly advantageous in encouraging members of an affinity group to promote their individual efforts so as to cause the collective affinity group to achieve a selected goal, or in encouraging sub-populations of a population to promote their individual efforts so as to cause the collective efforts of each sub-population to match or exceed other sub-populations. These advantages are achieved in embodiments of the invention in which each individual uses a client device to enter values (either over a period of time, or in response to a prompt by the client device), and in which the aggregated or pooled information is presented by means of a broadcast medium or other communication technique. For example, members of a weight-loss club can aggregate their individual weight-loss each day, so that the aggregated results can be announced on a popular television show or displayed at their client devices.

SUMMARY OF THE INVENTION

The invention provides a method and system for aggregating and pooling information with feedback in a computer communication system. A communication system includes a server device and a set of client devices. Each client device collects information from an associated individual (whether by asking questions of those individuals, or accepting data input from peripheral devices), and transmits that data to a server device. The server device, or some other device at its behest, determines statistical information with regard to that data (such as aggregate, correlation, dispersion, or other measures), and provides that information to a communication channel for distribution to the individuals.

In a first preferred embodiment, the communication channel includes a broadcast communication channel that members of an affinity group can display. In a second preferred embodiment, the communication channel includes redistributing the determined statistical measures to associated individuals using the client devices. In a first aspect, the invention includes distributing the computed statistical measure (such as an aggregate or sum) for the entire population. For example, the first aspect would include announcing a total weight-loss for a weight-loss club on a television show. In a second aspect, the invention includes comparing the computed statistical measure for a first sub-population against a similar statistical measure for a second sub-population. For example, the second aspect would include comparing total weight-loss for selected teams and awarding a prize or other benefit to the team with the best result.

DETAILED DESCRIPTION OF THE PREFERRED EMBODIMENT

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Related Applications

Inventions described herein can be used in combination or conjunction with inventions described in the following patent application(s):

Application Ser. No. 09/159,219, filed Sep. 23, 1998, in the name of Stephen J. Brown, titled "Modeling and Scoring Risk Assessment," assigned to the same assignee.
and Application Ser. No. 09/159,058, filed Sep. 23, 1998, in the name of Stephen J. Brown, titled "Reducing Risk Using Behavioral and Financial Rewards," assigned to the same assignee.

These applications are hereby incorporated by reference as if fully set forth herein.

System Elements

Figure 1:
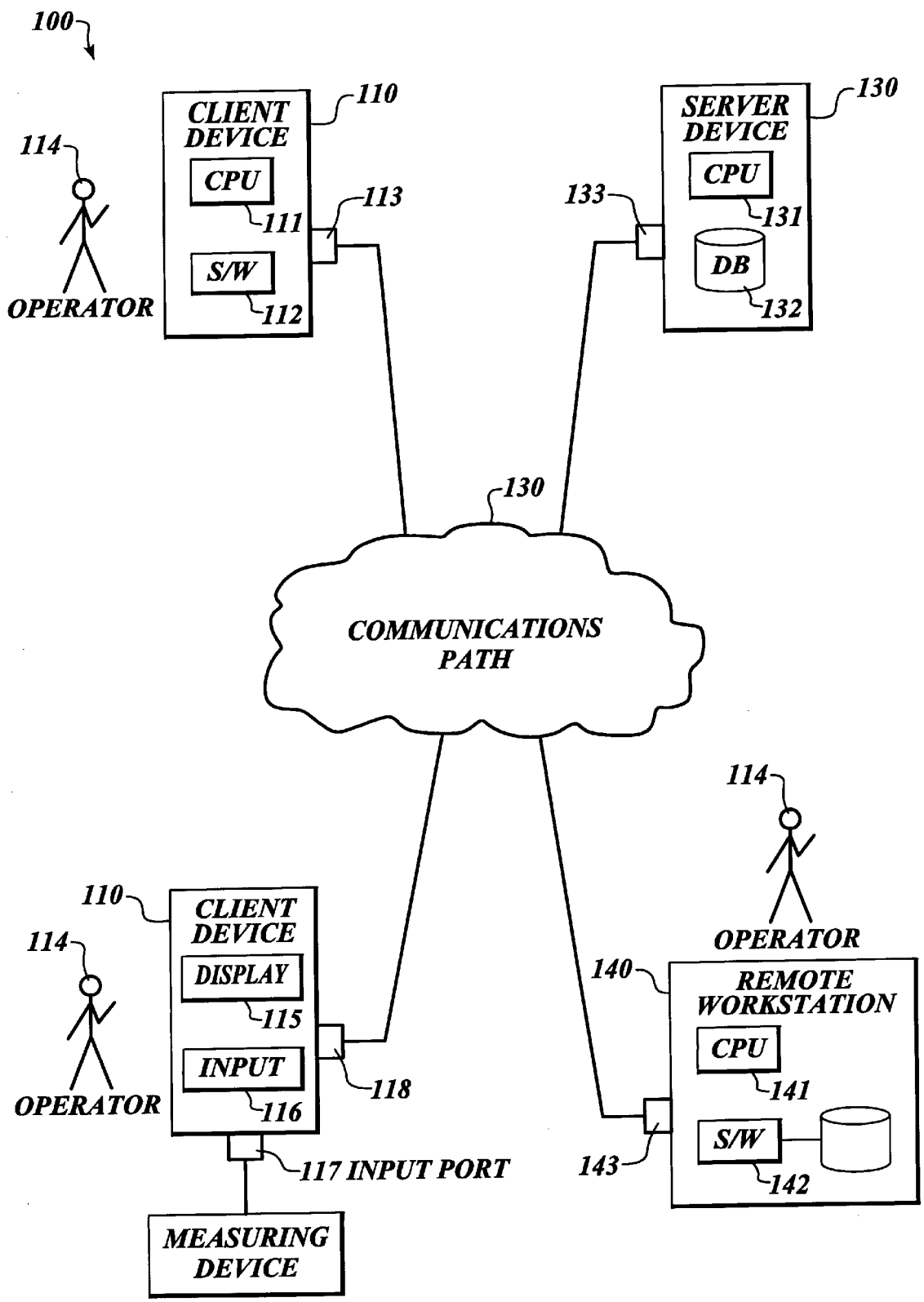
FIG. 1 shows a block diagram of a computer communication system for aggregating and pooling information.

FIG. 1 shows a block diagram of a computer communication system for aggregating and pooling information.

A system 100 includes a set of client devices 110, a communication path 120, a server device 130, and remote workstation 140.

Client Devices

The client devices 110 can be identical or can be of differing types. Thus, some client devices 110 can include the first type of client devices 110 as described below; some client devices 110 can include the second type of client devices 110 as described below, or some client devices 110 can include alternative types of client devices 110.

A first type of client device 110 includes a computer 111 (including a processor, memory, and mass storage), a set of web browser software 112, and a modem 113.

An embodiment of the first client device 110 is described in detail in the On-Line Bidding Disclosures.

The first type of client device 110 operates under control of the web browser software 112 and operating software to allow an operator 114 to perform web browsing activity. Known web browser software is available from Netscape Corporation or from Microsoft Corporation. Web browsing activity is described in documentation available from either of those companies.

The first type of client device 110 uses the modem 113 to send and receive messages using the communication path 120. The communication path 120 is described in further detail below.

A second type of client device 110 includes a "remote apparatus" such as described in the following patent application:

Application Ser. No. 08/847,009, filed Apr. 30, 1997, now U.S. Pat. No. 5,897,493, in the name of Stephen J. Brown, titled "Monitoring System for Remotely Querying Individuals," assigned to the same assignee.

This application is hereby incorporated by reference as if fully set forth herein.

The second type of client device 110 includes a display 115, an input device 116, an input port 117, and a communication interface 118.

The second type of client device 110 uses the display 115 to inform the operator 114 that input information is desired. The operator 114 can comprise a patient, a caregiver for the patient, or some other person. Preferably, the display 115 includes an alphanumeric display capable of displaying a question or request to the operator 114.

The second type of client device 110 uses the input device 116 to receive an answer to the question or request. For example, if the question asks for the patient's weight that day, the operator 114 uses the input device 116 to input the patient's weight for that day. The input device 116 can include a keypad or keyboard, such as for a computer or a television remote control, or can include a more restricted set of keys by which the operator 114 can increment, decrement, or accept a value to be entered for the patient's weight for that day.

The second type of client device 110 uses the input port 117 to receive data from a measuring device or other device. For example, the display 115 can request that the operator 114 couple the second client device 110 to a medical scale with an electronic readout, and the input port 117 can receive the electronic readout so as to directly receive a signal corresponding to the patient's weight for that day.

The second type of client device 110 uses the modem 113 similarly to the first type of client device 110, to send and receive messages using the communication path 120.

In alternative embodiments, the client device 110 may includes a wide variety of other devices, possibly including an electronic toy (such as a "game boy" or "virtual pet"), a telephone inter-operating with an interactive voice response system, a television set-top box inter-operating with a cable or satellite television interactive system, a medical device operated at medical personnel office, or any other system by which the operator 114 can enter a value to be used by the system 110 for aggregation and response.

Communication Path

The communication path 120 includes a set of electronic communication links for sending and receiving messages between the client devices 110 and the server device 130.

In a preferred embodiment, the communication path 120 includes the internet, to which the client devices 110 and the server device 130 are coupled. The messages are formatted using a communication protocol for use with the internet, such as TCP/IP, HTML, or a combination thereof. In alternative embodiments, the modem 113 may be replaced by any suitable communication interface, such as a direct communication link (such as a land-line or radio), another type of network link (such as a LAN, WAN, or combination thereof), or using another communication network (such as a private or public telephone network).

Server Device

The server device 130 includes a computer 131 (including a processor, memory, and mass storage), a database 132, and a modem 133. The server device 130 is similar to the "on-line auction company 12" described in detail in the On-Line Bidding Disclosures.

The server device 130 uses the modem 133 to send and receive messages using the communication path 120.

The server device 130 uses the database 132 to receive individual values entered by each client device 110, and to identify those individual values with their associated client device 110. The server device 130 also uses the database 132 to determine statistical measures of the pool of those values in response thereto.

In a preferred embodiment, the server device 130 operates in a similar manner as the "on-line auction company 12" described in detail in the On-Line Bidding Disclosures In a first preferred embodiment, the server device 130 aggregates the individual values entered by each client device 110. The server device 130 determines an aggregate value for the set of individual values, and sends that aggregate value back to each client device 110. Each client device 110 then displays the aggregate value to each individual operator 114, for use by the operator 114 or by an associated person, such as the patient.

For example, if the individual values each represent the weight lost by the patient for that day, the server device 130 can aggregate those values to determine a total weight lost by the entire set of patients having client devices 110. The server device 130 can then feed back that information to each client device 110 so that each patient can be motivated to contribute to the group effort, even if that individual patient's contribution is relatively minor.

The aggregate value determined by the server device 130 can be any statistical measure or other calculated measure responsive to the set of individual values provided by the set of client devices 110. For example, the aggregate value can be a total (as described with reference to the On-Line Bidding Disclosures), a maximum or minimum value, a median value, a selected centile value, a variance or standard deviation, or some other measure. It is expected that the aggregate value will have meaning to each individual patient associated with a client device 110, even if that individual patient's contribution to that aggregate is relatively minor.

In a second preferred embodiment, the server device 130 aggregates the individual values entered by each client device 110, but determines the aggregate values with regard to a set of affinity groups with which each individual is associated. As described in the On-Line Bidding Disclosures, each individual operator 114 at each individual client device 110 can choose to associate themselves with one or more selected affinity groups. As described in the On-Line Bidding Disclosures, these affinity groups contest against each other to obtain the "best" aggregate value. For example, in an on-line auction, the best aggregate value is the highest total bid.

The server device 130 determines a separate aggregate value for each affinity group, and feeds back those separate aggregate values to each client device 110 (or to just those client devices 110 associated with the selected affinity group).

For example, if the individual values each represent the weight lost by the patient for that day, the server device 130 can determine separate aggregate values for each affinity group, to determine a total weight lost by the entire set of patients in each affinity group. The server device 130 can then feed back that information to each client device 110 so that each patient can be motivated to contribute to their selected affinity group effort, even if that individual patient's contribution is relatively minor.

The individual values and the separate aggregate values can be selected from a wide variety of possible values, so as to promote individual well being on behalf of each patient, and on the part of each selected affinity group.

For a first example, the individual values can be the measured height and weight for each patient, and the aggregate value (whether a single aggregate value or a set Weight of separate aggregate values) can be a deviation from ideal weight for the entire affinity group.

For a second example, the individual values can be monetary contributions to a charitable or other financial cause, and the aggregate value (whether a single aggregate value or a set of separate aggregate values) can be a total monetary contribution.

For a third example, the individual values can be sales made by field salespersons for a company or product, and the aggregate value (whether a single aggregate value or a set of separate aggregate values) can be a total amount of sales.

Remote Workstation

A remote workstation 140 is coupled to the server device 130, so as to access information in the database 132 and to receive the aggregate values (whether a single aggregate value or a set of separate aggregate values).

The remote workstation 140, similar to the first type of client device 110, includes a computer 141 (including a processor, memory, and mass storage), a set of database software 142 or other display software (such as a set of web browser software), and a modem 143.

The remote workstation 140 uses the database software 142 or other display software to access the database 132. In accessing the database 132, the remote workstation 140 can receive the aggregate values (whether a single aggregate value or a set of separate aggregate values), or can receive selected sets of individual values from the client devices 110.

The remote workstation 140 uses the modem 143 similarly to the way the client device 110 or the server device 110 use their respective modems.

An operator 144 at the remote workstation 140 can use the database software 142 or other display software to add a broadcast message to the database 132. The server device 130, when feeding back the aggregate value, sends the broadcast message to the client devices 110.

The broadcast message can be a congratulatory message relating to the resultant aggregate value, an exhortatory or inspirational message for the one or more selected affinity groups, or a commercial or political message to one or more selected affinity groups.

For a first example, if the resultant aggregate value indicates that a weighloss club has collectively lost 10,000 pounds of weight in one day, and this is a new record, the broadcast message can indicate the new record and congratulate all patients, even those whose contribution was relatively minor.

For a second example, the broadcast message can be a daily inspirational message for an affinity group, selected by the operator 144 at the remote workstation 140.

For a third example, the broadcast message can be a prize announcement (or an announcement of another benefit) to the individual patient who contributes most to the aggregate value. Similarly, when there are multiple affinity groups, the broadcast message can announce a prize or other benefit to the team with the best result.

Method of Operation

Figure 2:
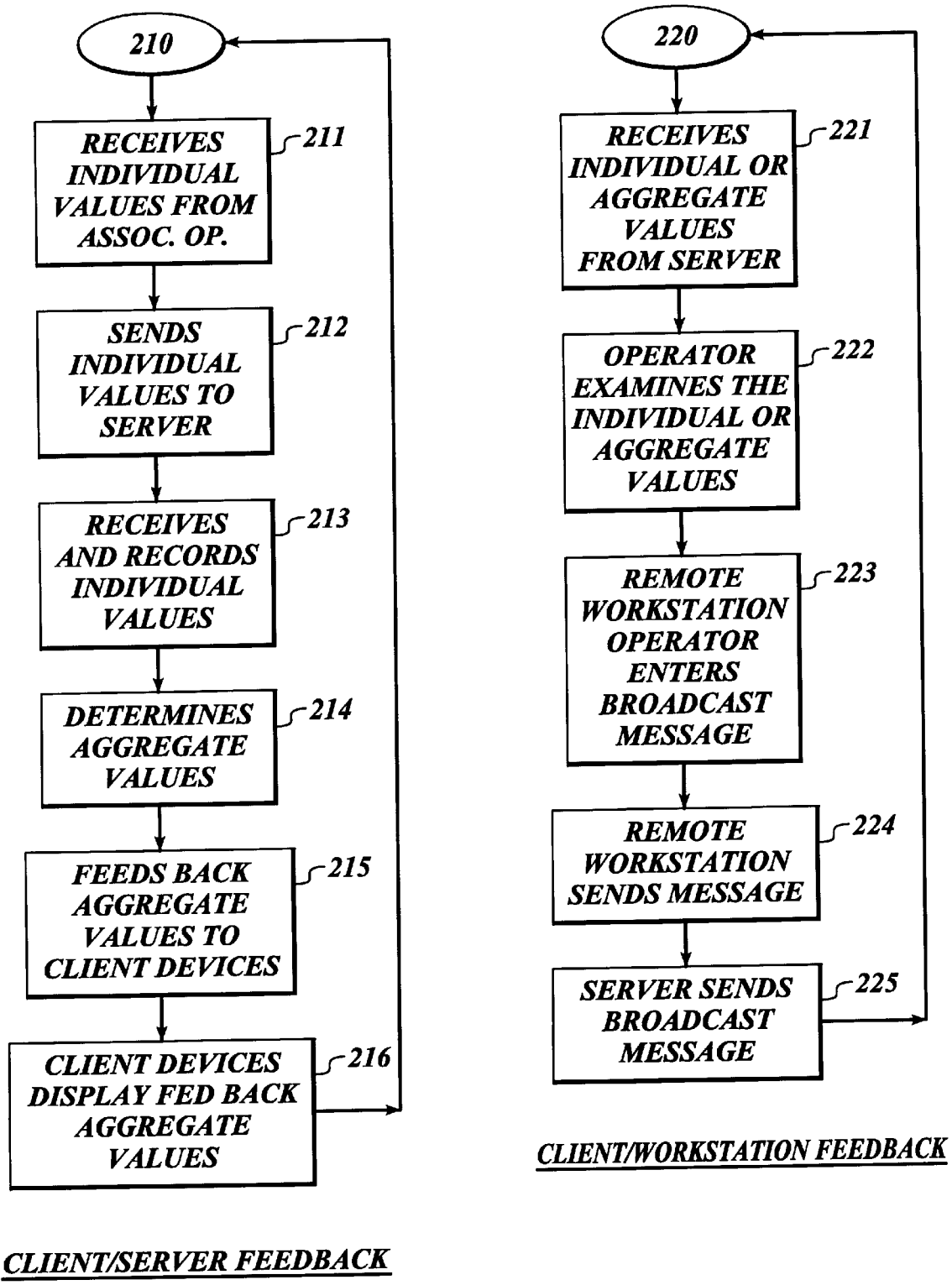
FIG. 2 shows a process flow diagram of a method for aggregating and pooling information in a computer communication system.

FIG. 2 shows a process flow diagram of a method for aggregating and pooling information in a computer communication system.

A method 200 includes a set of flow points to be reached, and steps to be performed, by elements of the system 100, including the client devices 110, the server device 130, and the remote workstation 140.

Client/Server Feedback At a flow point 210, the system 100 is ready to receive individual values from client devices 110.

At a step 211, client devices 110 receive individual values from their associated operators 114. As noted above, each client device 110 can receive an individual value in response to a question-and-answer session, or can receive an individual value in response to a coupled data-collection device.

At a step 212, client devices 110 send their individual values to the server device 130. Operators at each client device 110 can select an affinity group in response to a menu of affinity groups presented by the server device 130.

At a step 213, the server device 130 receives the individual values and records them in the database 132.

At a step 214, the server device 130 determines one or more aggregate values (either a single aggregate value or a set of separate aggregate values) in response to the set of individual values.

At a step 215, the server device 130 feeds back the one or more aggregate values to the client devices 110.

At a step 216, the client devices 110 display the fed back aggregate values to their associated operators 114.

The method 200 thereafter proceeds with the flow point 210 again, such as a next day. For example, the method 200 can be selected to operate at a same or similar time each day.

Client/Workstation Feedback

At a flow point 220, the remote workstation 140 is ready to receive individual values or aggregate values from the server device 130.

At a step 221, the remote workstation 140 receives individual values or aggregate values from the server device 130.

At a step 222, the operator 144 at the remote workstation 140 examines the received individual values or aggregate values.

At a step 223, the operator 144 at the remote workstation 140 enters a broadcast message to be sent to client devices 110.

At a step 224, the remote workstation 140 sends the broadcast message to the server device 130.

At a step 225, the server device 130 sends the broadcast message to selected client devices 110 (or to all of them).

The method thereafter proceeds with the flow point 220 again, such as a next day. For example, the method 200 can be selected to operate at a same or similar time each day.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of aggregating information for individuals in a population thereof, said method including steps for:
   a) collecting information for each individual at a client device associated with said individual;
   b) sending said collected information from said client device to a server device;
   c) generating statistical information from said collected information sent from a plurality of said client devices;
   d) distributing said statistical information to one or more of said individuals; and
   e) repeating steps a–d after a period of time has elapsed, and
   wherein said statistical information includes one or more aggregate values of the collected information, and wherein the collected information is an amount of weight loss by each individual in the population and said determined statistical information is a combined weight loss for a plurality of the individuals in the population.

2. A method as in claim 1, wherein said steps for collecting information include steps for
   coupling said client device to a data collection element for said individual; and
   collecting said information from said data collection element.

3. A method as in claim 1, wherein said steps for collecting information include steps for
   prompting said individual, at said client device, for said information; and
   collecting said information from said individual in response to said steps for prompting.

4. A method as in claim 1, wherein said steps for determining statistical information include steps for
   determining a first statistical measure for a first sub-population of said individuals; and
   determining a second statistical measure for a second sub-population of said individuals.

5. A method as in claim 1, wherein
   said steps for determining statistical information include steps for (1) determining a first statistical measure for a first sub-population of said individuals, and (2) determining a second statistical measure for a second sub-population of said individuals; and
   said steps for distributing include steps for distributing both said first statistical measure and said second statistical measure.

6. A method as in claim 1, wherein
   said steps for determining statistical information include steps for (1) determining a first statistical measure for a first sub-population of said individuals, and (2) determining a second statistical measure for a second sub-population of said individuals; and
   said steps for distributing include steps for (1) comparing said first statistical measure and said second statistical measure, and (2) distributing a result of said steps for comparing.

7. A method as in claim 1, wherein
   said steps for determining statistical information include steps for (1) determining a first statistical measure for a first sub-population of said individuals, and (2) determining a second statistical measure for a second sub-population of said individuals; and
   said steps for distributing include steps for (1) comparing said first statistical measure and said second statistical measure, and (2) awarding a benefit in response to a result of said steps for comparing.

8. A method as in claim 1, wherein said steps for distributing include broadcast communication.

9. A method as in claim 1, wherein said steps for distributing include sending said statistical information from said server device to at least one said client device.

10. The method of claim 1, wherein said amount of weight loss is an amount of weight loss since the last execution of step a.

11. The method of claim 1, wherein the repetition of steps a–d is performed a predetermined number of times.

12. A method including steps for:
   a) entering at each one of a set of client devices, a value associated with said client device;
   b) sending, for each one of said client devices, said entered value to a server device;
   c) determining, at said server device, an aggregate value in response to said values;
   d) sending, from said server device to one or more said client device, said aggregate value;
   e) displaying, at said client devices, said aggregate value; and
   f) repeating steps a–e after a period of time has elapsed
   wherein said entered value is an amount of weight loss by each individual in a population and said determined aggregate value is a combined weight loss for a plurality of individuals in the population.

13. A system for aggregating information for individuals in a population thereof, said system including:
   a set of client devices, each disposed for collecting an individual value for an individual associated therewith;
   a server device, disposed for receiving said individual values, and for determining at least one aggregate value in response thereto; and
   a communication path between said client devices and said server device;

wherein said server device distributes said at least one aggregate value to a plurality of said client devices;

wherein each of the client devices repeats collecting the individual value for the individual associated therewith, said server device repeats the determination of at least one aggregate value in response to the repeated collection performed by the client devices and said server device distributes the repeated determination of the at least one aggregate value to a plurality of said client devices, when a preset period of time has elapsed since the previous collection of individual values, determination of at least one aggregate value and distribution of said at least one aggregate value;

wherein the collected individual value is an amount of weight loss by each individual in the population and said determined at least one aggregate value is a combined weight loss for a plurality of the individuals in the population.

14. A system as in claim 13, wherein at least one said client device includes a data collection element disposed for measuring said individual value for said individual.

15. A system as in claim 13, wherein at least one said client device includes a display element, said display element capable of prompting said individual, at said client device, for said individual value; and an input element, said input element disposed for collecting said individual value in response to said display element.

16. A system as in claim 13, wherein said at least one aggregate value includes a first aggregate value for a first affinity group of said individuals; and a second aggregate value for a second affinity group of said individuals.

17. A system as in claim 13, wherein said communication path includes broadcast communication.

18. The system of claim 13, wherein said amount of weight loss is an amount of weight loss since the previous collection of individual values, determination of at least one aggregate value and distribution of said at least one aggregate value.

19. The system of claim 13, wherein the functions performed by the set of client devices and said server device are repeated a predetermined number of times.

* * * * *

UNITED STATES PATENT AND TRADEMARK OFFICE
CERTIFICATE OF CORRECTION

PATENT NO. : 6,240,393 B1
DATED : May 29, 2001
INVENTOR(S) : Stephen J. Brown

It is certified that error appears in the above-identified patent and that said Letters Patent is hereby corrected as shown below:

Title page,
Item [73], Assignee, change "Health Pro Network, Inc.," to -- Health Hero Network, Inc. --

Signed and Sealed this

Twenty-fifth Day of January, 2005

JON W. DUDAS
*Director of the United States Patent and Trademark Office*